United States Patent [19]

Thomas

[11] Patent Number: 5,024,359
[45] Date of Patent: Jun. 18, 1991

[54] BICYCLE COOLER

[76] Inventor: Jan B. Thomas, 22 Deallyon #40, Hilton Head, S.C. 29929

[21] Appl. No.: 465,913

[22] Filed: Jan. 16, 1990

[51] Int. Cl.⁵ .............................. B62J 7/06; B62J 7/00
[52] U.S. Cl. .................................. 224/36; 224/30 A; 224/32 R; 224/33 R
[58] Field of Search .............. 224/36, 30 A, 41, 32 R, 224/33 A, 39, 40, 314, 318, 321; 220/85 H, 16, 18; 248/214, 311.2, 293

[56] References Cited

U.S. PATENT DOCUMENTS

| 613,226 | 11/1898 | Adams | 224/38 |
|---|---|---|---|
| 637,733 | 11/1899 | Hall | 224/38 |
| 767,823 | 8/1904 | Lederman | 224/41 |
| 3,613,970 | 10/1971 | Humlong | 224/36 |
| 3,955,729 | 5/1976 | Montgomery | 224/36 |
| 4,056,219 | 11/1977 | Hine, Jr. | 224/36 |
| 4,260,086 | 4/1981 | Hine, Jr. et al. | 224/36 |
| 4,315,583 | 2/1982 | Hine, Jr. | 224/41 |
| 4,415,105 | 11/1983 | Jackson | 224/41 |
| 4,440,332 | 4/1984 | Kullen | 224/36 |
| 4,542,839 | 9/1985 | Levine et al. | 224/36 |
| 4,638,933 | 1/1987 | Boufford | 224/41 |
| 4,730,758 | 3/1988 | McMurtrey | 224/36 |

Primary Examiner—Henry J. Recla
Assistant Examiner—David J. Walczak
Attorney, Agent, or Firm—McAndrews, Held & Malloy, Ltd.

[57] ABSTRACT

An insulated cooler adapted for detachable mounting to the head and handlebar intersection of a conventional bicycle. The container has connective attachment elements adapted for recess storage into the side wall of the cooler to avoid obstructive and unsightly attachment members during detached use of the container.

22 Claims, 3 Drawing Sheets

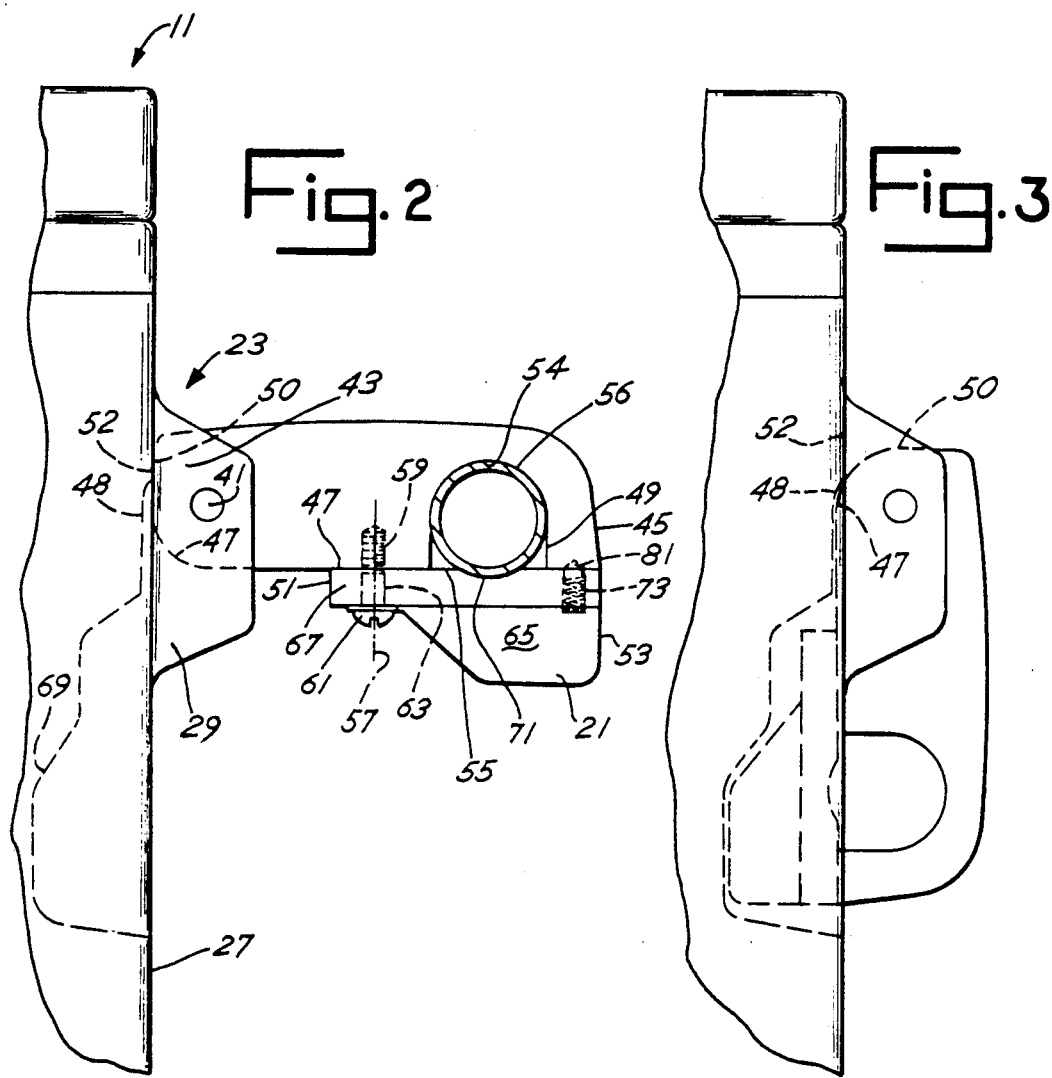
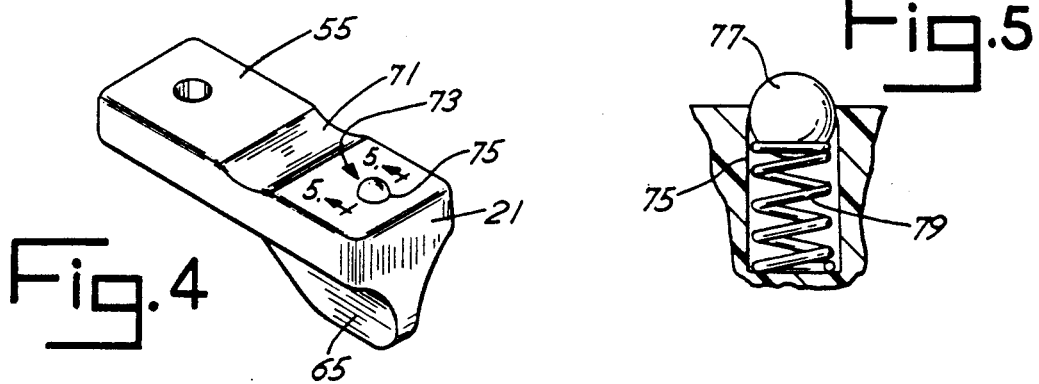

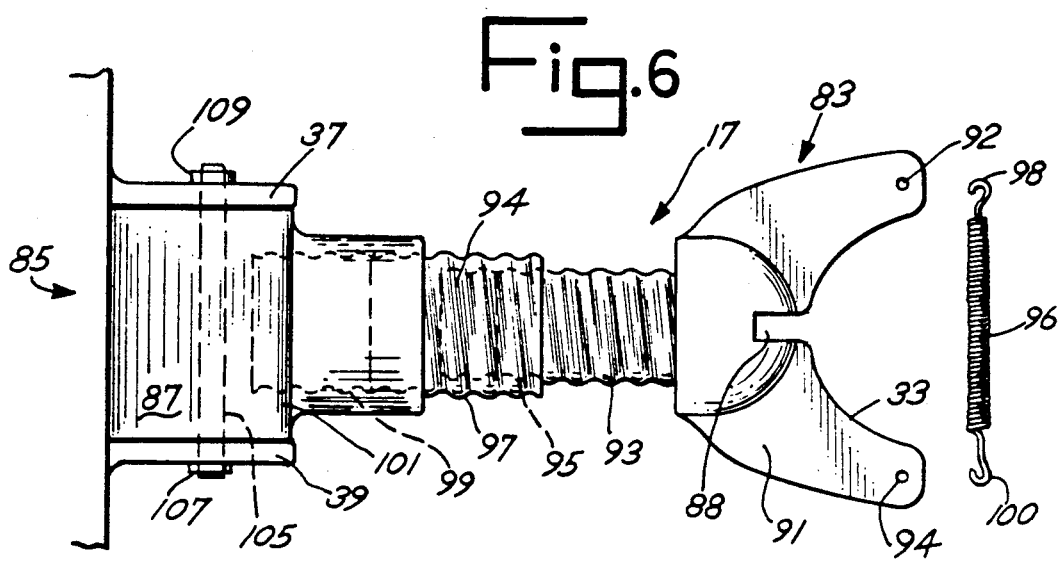
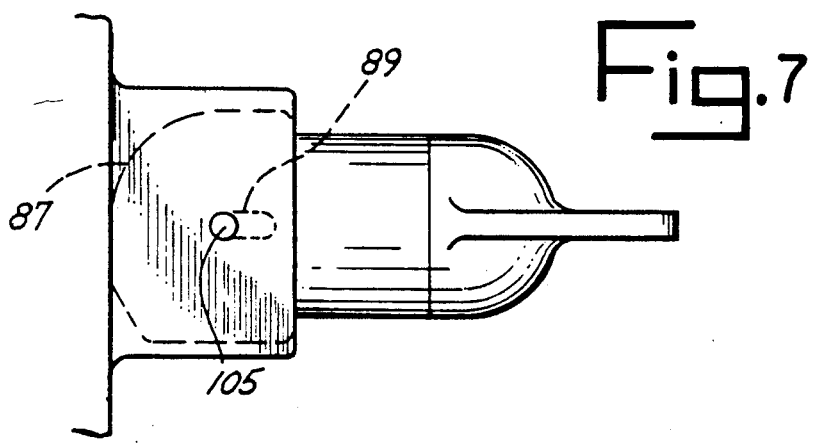
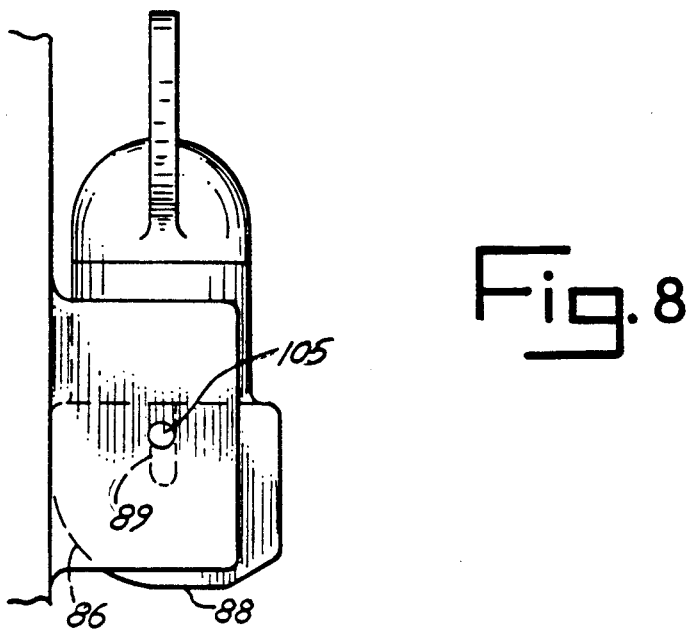

5,024,359

BICYCLE COOLER

BACKGROUND OF THE INVENTION

This invention relates to a container adapted for detachable mounting to the head and handlebar intersection of a conventional bicycle, and more particularly, relates to an insulated cooler having connective attachment elements adapted for recess storage into the side wall of the cooler to avoid obstructive and unsightly attachment members during detached use of the cooler.

There are numerous bicycle packs, pack supports, baskets and other assemblies known in the prior art. These devices generally utilize straps and clips for attaching baskets or light weight packs to a bicycle. The object of these prior packs and pack supports is to provide a light weighty, usually softsided or wire frame, container for transporting small articles normally used for bicycle maintenance.

However, occasions arise such as picnic trips, etc., where it is desired to carry much larger items by bicycle. It would be highly desireable to provide for a larger heavy duty container, such as an insulated cooler or similarly large container, which could be quickly and conveniently attached to a bicycle.

It is therefore an object of the present invention to provide a heavy duty container which easily attaches to a bicycle.

It is a further object of the present invention to provide an insulated cooler adapted for attachment to a bicycle.

It is yet another object of the present invention to provide a cooler having attachment members which can be partially concealed or stored in the side walls of the cooler.

SUMMARY OF THE INVENTION

These and other objects of the invention are achieved in a container having an attachment assembly. The attachment assembly is easily and quickly attachable to and removable from a conventional bicycle. The attachment assembly includes component parts which are pivoted relative to the container for partial storage of the assembly in the side wall of the container.

BRIEF DESCRIPTION OF THE DRAWINGS

FIG. 2 is a side view of an arm support portion of the attachment assembly of the container of FIG. 1, showing the arm support in an extended position for attachment of the cooler to a conventional bicycle.

FIG. 3 is a side view of the attachment assembly of the container of FIG. 1, showing the arm support in a closed position.

FIG. 4 is a perspective view of a swing tab of the attachment assembly of the container of FIG. 1.

FIG. 5 is a partial cutaway side view of the swing tab of FIG. 4.

FIG. 6 is a top view of a foot support portion of the attachment assembly of the container of FIG. 1.

FIG. 7 is a side view of the foot support portion of FIG. 6, showing the foot support portion in a shortened mode.

FIG. 8 is a side view of the foot support portion of FIG. 7, showing the foot support portion in a pivoted upright and locked position.

DETAILED DESCRIPTION OF THE INVENTION

Figure 1:
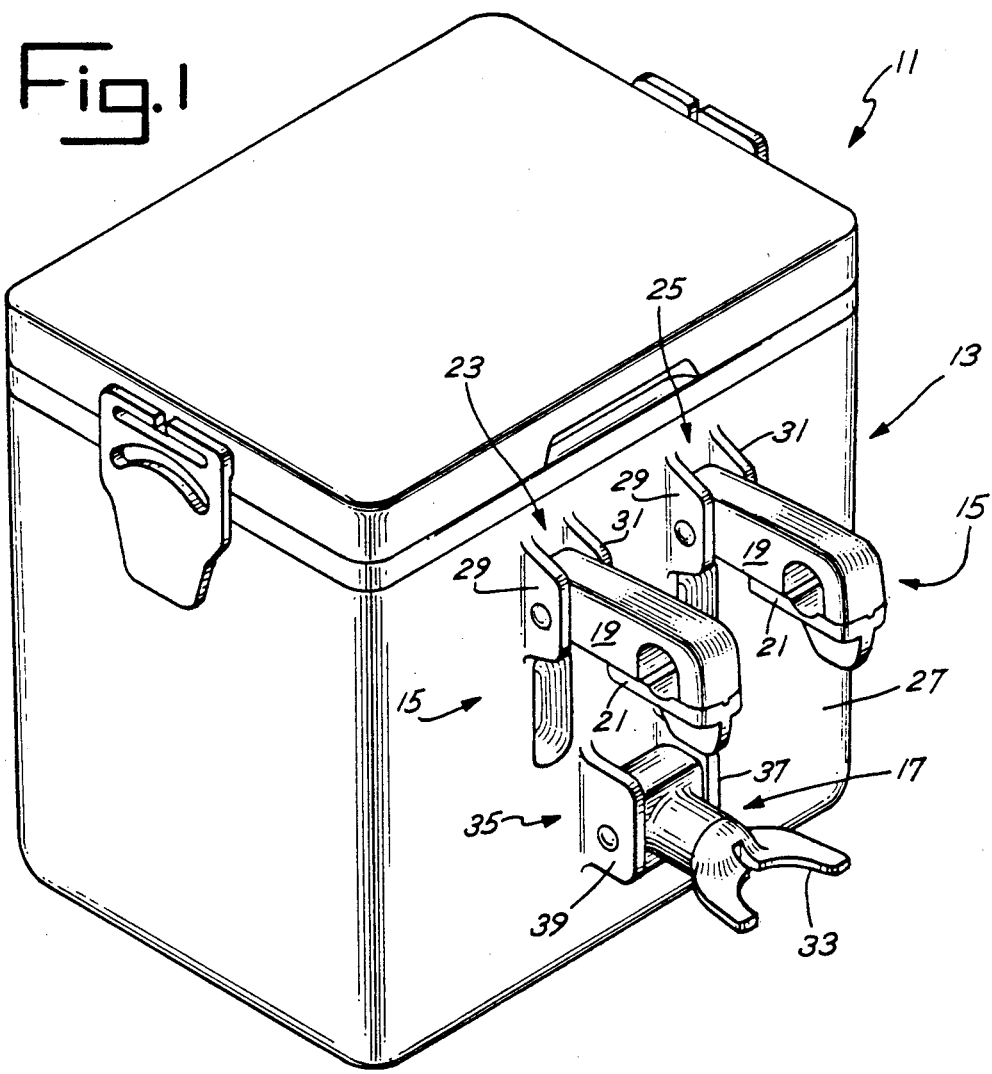
FIG. 1 is a perspective view of an insulated cooler embodiment of the present invention.

Referring to FIG. 1, a heavy duty insulated cooler or container 11 has an attachment assembly generally indicated by reference numeral 13. Attachment assembly 13 comprises a pair of arm supports 15 and a foot support 17. Each arm support 15 is formed of a top arm extension 19 and a lower rotatable swing tab 21. Arm extension 19 and tab 21 cooperate to grip the handle bars of a bicycle for firmly supporting the container.

Arm extensions 19 are attached to molded brackets 23,25 which are molded integral with the backside 27 of the container. Brackets 23,25 are symmetrically positioned on the container backside and spaced apart a distance sufficient to permit arm supports 15 to grip a conventional pair of bicycle handle bars. Each bracket 23,25 includes a pair of upstanding bearing members 29,31 which are spaced apart a distance sufficient to permit arm extensions 19 to pivot between members 29,31.

Adjustable foot support 17 is positioned below the arm supports 15 and along the vertical center line of container 11. Foot support 17 includes a curved surface 33 which slidingly mates with the curved head of the bicycle for providing a brace support to stabilize the container during bicycle movement. This three point attachment provides a fixed gripping at two points on the handlebars and a rotating support at one point on the head allowing the handlebars to be turned during bicycle operation.

Foot support 17 is attached to a molded bracket 35 which is formed integral with backside 27 of the container. Bracket 35 includes a pair of upstanding members 37,39 which are spaced a distance sufficient to permit foot support 17 to pivot between members 37,39.

Referring to FIG. 2, each of the bearing members 29,31 define a pivot axis 41 about which arm extension 19 pivots. A conventional means for permitting the pivoting of arm extension 19 relative to the container may be used. For example, a bolt or pin fastener may be used; axle pins (not shown) molded integral to arm extension 19 may fit within holes formed in bearing members 29,31, etc.

Arm extension 19 has an inner end 433, an outer end 45 and an underside surface 47. Inner end 43 is provided with a rounded corner surface 47 which provides a smooth curved surface allowing arm extension 19 to be rotated downwardly and against backside 27 (as shown in FIG. 3). As will suggest itself, the backside 27 of the cooler may be molded in the area of brackets 23,25 with a particular surface 48 having a configuration which cooperates with the curved surface 47 to permit downward rotation of arm extension 19.

Alternatively, surface 48 may be flat and flush with the majority of the surface plane of the backside 27, and curved surface 47 is configured to cooperate with flat surface 48 to permit the arm rotation.

In addition, inner end 43 of arm extension 19 includes a flat surface 50 (FIG. 3) which serves as a stop to limit the extent of upward rotation of arm extension 19. Flat surface 50 abuts a flat surface 52 (FIG. 2) formed on the backside 27 of the container in the area of brackets 23,25.

The underside surface 47 of arm extension 19 has a curved recess 49 having a radius central portion 54 of a size to snugly receive conventional handlebars 56. Recess 49 extends across the width of the arm extension 19 permitting handlebars 56 to pass through the arm extension.

Each swing tab 21 has an inner end 51, an outer swinging end 53 and a topside surface 55. Swing tab 21 is secured to arm extension 19 along a pivot axis 57 so that the tab can pivot about axis 57. A pivot pin 59 passes through tab 21 and is threadably received into arm extension 19. Pin 57 includes a pin head 61 which establishes the spacing between which tab 21 swings relative to the underside surface 47 of arm extension 19. A hole 63 passes through tab 21 forming a cylindrical bearing surface for pivoting on pin 59.

Tab 21 includes an enlarged thumb tab 65 formed at the outer end 53 of the swing tab and which narrows to an area where pin hole 63 is formed. Thumb tab 65 is located beneath handlebar aperture 49 and provides an area of the user's thumb to push the swing tab about pivot axis 57. The thumb area 65 permits the operator to provide a large amount of force to move the swing tab into a locked position beneath handlebars 56.

As shown in FIG. 4, top surface 55 of swing tab 21 includes a grooved out recess 71 having a radius such that the recess 71 snugly mates with the underside of the handlebars, as shown inn FIG. 2. As the user pushes thumb tab 65 during pivoting, the topside surface 55 of the swing tab is forced against the handlebar until recess 71 aligns with the handlebar snapping the swing tab into its locked position.

A locking member 733 includes a cylindrical opening 75 (FIG. 4) for housing a spring 79 and ball bearing 77 as shown more particularly in FIG. 5. As swing tab 21 is rotated into alignment with arm extension 19, ball 77 (FIG. 5) contacts the underside surface 47 of the arm extension which forces ball bearing 77 within the opening 75. Spring 79, biases ball bearing 77 upward against the underside of arm extension 19 until a semi-spherical indentation 81 (FIG. 2) aligns with ball bearing 77. Ball bearing 77 is forced within the semi-spherical indentation 81 serving to lock swing tab 21 relative to extension arm 19. As will suggest itself other types of locking arrangements may be used including protuberances molded to the top surface of the swing tab for mating with like shape indentations in the lower side surface of arm extension arm 19.

Referring again to FIG. 2, a pair of recesses 69 are molded into the backside of container 11, as shown more clearly in FIG. 1, for receiving support arms 15 as the arms are pivoted downwardly against the backside 27 of the container. The size and shape of the recesses 69 may be varied in accordance with the particular shape of arms 51 and are such as to receive the lower rotatable swing tab 21, as shown in FIG. 3. This provides a pleasant appearance to the backside of container 11 without any obstructive extensions. Only a portion of arms 15 stand off the backside of the container when the arms are in their downward closed position.

Referring to FIG. 6, adjustable foot support 17 includes a distal end 83 carrying curved surface 33 and a proximal end 85 which is pivoted between upstanding members 37,39. Proximal end 85 is shaped with a curved surface 87, as shown in FIG. 7, for permitting foot support 17 to pivot vertically upwardly against the backside 27 of the cooler as shown in FIG. 8. A flat surface 88 (FIG. 8) limits downward rotation of foot support 17.

Distal end 83 includes a head brace 91 designed for engaging a bicycle head (not shown). Curved surface 33 is of a size for making contact with a conventional cylindrical bicycle head. A slot 88 is formed in the center area of curve 33 for receiving the brake cable of the bicycle if the bicycle has hand brakes.

Head brace 91 includes a cylindrical extension 93 which is threaded on its outer surface for mating with a threaded interior cylindrical surface 94 of a coupling member 97. Extension 933 can be extended relative to coupling member 97 by relative rotation of the two.

The outer surface of coupling member 97 is also threaded for matably receiving an inner cylindrical threaded surface 99 of a base member 101. Base member 101 forms the proximal end of foot support 17 and includes a locking slot 89 for receiving a pivot pin 105. Holding nuts 107,109 are secured at each end of pin 105 which passes through pivot member 101 and upstanding members 37, 39.

Extension 93 and coupling member 97 are rotated to extend the adjustable foot for forcing head brace 91 against the bicycle head. As brace 91 is forced against the bicycle head, the back end of base member 101 is driven against the backside of the cooler. Slot 89 permits rearward movement of the foot against the cooler s the foot is adjusted in length.

Locking slot 89 is formed in base member 101 (FIG. 7) such that distal end 83 of the foot support 17 may be pivoted relative to upstanding members 37,39 for locking the head brace 91 in a position between the extension arms 19 when the arms are pivoted tight against backside 27 of the container. The locking slot 89 permits the adjustable foot support 17 to slide downwardly within slot 89 when the foot is pivoted upwardly in a position parallel to the backside of the container. This places foot support 17 in a position such that it can no longer rotate or become loose. Support foot 17 must be moved vertically upward allowing the pivot pin 105 to move the full extent of slot 89 before foot 17 may be pivoted downwardly. This changes the pivot point of the foot support 17. The radiused surface 86 permits the foot to pivot downwardly.

In addition, head brace 91 includes a pair of holes 92,94 formed on opposite sides of curved surface 33. A security strap 96 includes a pair of fastening hooks 98,100 for fastening into holes 92,94. Strap 96 may be formed from an elastic material or spring material, and fits around the back of the head of the bicycle for biasing head brace 91 against the front of the head.

As understood, arm supports 15 and foot support 17 may be attached to brackets 23,25,35 secured to a flat plate (not shown) which in turn may be connected to the backside of a conventional cooler. Such a flat plate would include the pair of recesses 69.

Other modifications and additions to the present invention not disclosed herein may also be made without departing from the spirit and scope of the invention which is defined by the following claims.

What is claimed is:

1. A container for detachable connection to the head and handlebar intersection of a bicycle frame comprising:
   a container having a back side,
   the back side having a first securement arm member, a second securement arm member and a foot member;
   the arm members being symmetrically positioned about a vertical centerline on the container back side and adapted to mount over the bicycle handlebar and for securement thereto; and the foot member located below the arm members on the vertical centerline, said foot member having an extension member and a base member, said extension member being rotatable relative to said base member for extending the physical length of said foot member outwardly and against the bicycle head.

2. A container having recessable members adapted for detachable connection to a bicycle, the bicycle having a frame, a head, and handlebars comprising:
a back side,
said back side having three molded brackets, a first arm member, a second arm member, and an adjustable foot member, said arm members and said foot member being pivotally mounted to a separate one of said molded brackets, and recesses located in said backside below said arm members for receiving said arm members when said arm members are pivotally moved in said mold brackets,
said molded brackets for said arm members being symmetrically positioned about a vertical centerline on the container back side and the bracket for the adjustable foot member being positioned below the arm member brackets along the vertical centerline,
said arm members having an elongated top portion and a tab,
said top portion having a first end, a second end, and an underside, the first end being pivotally attached to the container molded bracket, the underside of said top portion having a recess disposed near its second end adapted to engage the bicycle handlebar;
said tab having a first end, a swinging end, and a topside surface, the first end being rotatably attached to the underside of said top portion between the recess and the first end.

3. A container according to claim 2 wherein said swing tab has a geometric shape; and wherein each of said recesses being shaped for receiving a swing tab.

4. A container according to claim 2 wherein said adjustable foot member has a proximal end, a distal end, and a telescopically adjustable means, the said foot member having a head brace at said distal end for engaging the bicycle head, said proximal end being pivotally attached to a molded bracket so that the distal end may be pivoted for locating said head brace in a position between said arm members when the same are pivoted tight against said back side.

5. A container having recessable arm supports adapted for detachable connection to a bicycle, the bicycle having a frame, a head, and handlebar comprising:
an attachment assembly,
said attachment assembly having three molded brackets, a pair of arm supports and a foot support, said arm supports and said foot support being pivotally mounted to one of said molded brackets, and recesses located below the arm support brackets for receiving said arm supports when said arm supports are pivotally rotated into said recesses,
said molded brackets for the arm supports being symmetrically positioned about a vertical centerline on said attachment assembly and spaced apart a distance sufficient to permit said arm supports to grip said handlebar and the bracket for the foot support being positioned below the arm support brackets along the vertical centerline,
said arm supports having a top arm extension and a lower rotatable swing tab, said arm extension and tab cooperating to grip said handlebar of said bicycle for firmly supporting said container,
said arm extension having an inner end, an outer end, and an underside surface, the inner end being pivotally attached to the container molded bracket, said arm extension inner end having a rounded corner surface providing a smooth curved surface allowing said arm supports to be rotated downwardly for storage in said recesses, said arm extension also having in its underside near its outer end a curved recess having a radius central portion of a size to snugly receive said handlebar, said recess extending across the width of the arm extension,
said swing tab having an inner end, an outer swinging end, and a topside surface, the tab inner end being rotatably attached to the underside of the arm extension between the curved recess and the arm extension inner end, the tab also having a locking means for engaging the arm extension underside at said outer end when said swing tab is rotated into alignment with said arm extension, said swinging end having an enlarged thumb tab,
said foot support having a proximal end and a distal end, said proximal end being pivotally attached to said foot support molded bracket and having a curved surface for permitting said foot support to pivot vertically upward and a coupling member, said coupling member having a threaded interior cylindrical surface, said distal end having a head brace having a curved surface for engaging said bicycle head, said head brace having a cylindrical extension threaded on an outer surface for mating with said threaded interior cylindrical surface of said proximal end coupling member.

6. The container of claim 5 wherein the arm extension inner end is provided with a flat surface adjacent to said rounded corner surface for limiting the extent of upward rotation of said arm supports.

7. The container of claim 5 wherein the swing tab locking means comprises a cylindrical opening for housing a spring and ball bearing and the arm extension underside surface is provided with a corresponding semi-spherical indentation for engaging said ball bearing.

8. The container of claim 5 wherein said head brace is provided with a slot for accommodating a bicycle hand brake cable.

9. The container of claim 5 wherein the foot support proximal end is provided with a locking slot permitting the foot support to slidingly lock when the foot support is vertically positioned.

10. The container of claim 5 wherein said head brace is provided with a pair of holes on opposite sides of said curved surface for engagement with a security strap for biasing said head brace against said bicycle head.

11. The container of claim 5 wherein the swing tab top surface is provided with a grooved out recess having a radius to snugly mate with the underside of the handlebar.

12. A container according to claim 1 wherein said foot member includes a coupling member coupling said extension member and said base member.

13. A container according to claim 1 wherein said extension member includes a head brace.

14. A container according to claim 13 wherein said head brace includes a curved surface sized for receiving the bicycle head.

15. A container according to claim 13 wherein said head brace includes a slot for accommodating a bicycle hand brake cable.

16. A container according to claim 1 wherein said base member is pivotably mounted to said back side.

17. A container according to claim 16 wherein said base member includes locking means for locking said foot member in a fixed position relative to said back side.

18. A container according to claim 17 wherein said locking means includes a lock slot.

19. A container according to claim 16 wherein said base member includes a surface for mating with said back side for bracing said foot member inn an extended position.

20. A container having recessable members adapted for detachable connection to a bicycle, the bicycle having a frame, a head, and handlebars comprising:
a back side,
said back side having three molded brackets, a first arm member, a second arm member, and a foot member, said arm members and said foot member being pivotally mounted to a separate one of said molded brackets, and recesses located in said backside relative to said arm members for receiving said arm members when said arm members are pivotally moved in said mold brackets, said molded brackets for said arm members being symmetrically positioned about a vertical centerline on the container back side and the bracket for the foot member being positioned below the arm member brackets along the vertical centerline,
each of said arm members being elongated and having a first end and a second end, said first end being pivotally attached to a container molded bracket, and each of said arm members having a securement means disposed near its second end for engaging the bicycle handlebar.

21. A container according to claim 20 wherein said foot member is outwardly extendable in length.

22. A container accordng to claim 20 wherein said foot member includes an extension member and a base member, said extension member being rotatable relative to said base member for extending the physical lengths of said foot member.

* * * * *